(12) United States Patent
Abali et al.

(10) Patent No.: US 8,074,047 B2
(45) Date of Patent: Dec. 6, 2011

(54) SYSTEM AND METHOD FOR CONTENT REPLICATION DETECTION AND ELIMINATION IN MAIN MEMORY

(75) Inventors: Bulent Abali, Tenafly, NJ (US); Mohammad Banikazemi, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 12/122,141

(22) Filed: May 16, 2008

(65) Prior Publication Data

US 2009/0287901 A1  Nov. 19, 2009

(51) Int. Cl.
*G06F 12/06* (2006.01)
*G06F 12/10* (2006.01)

(52) U.S. Cl. ........ 711/206; 711/200; 711/202; 711/203; 711/205; 711/207; 711/21; 711/E12.058

(58) Field of Classification Search .................. 711/200, 711/202–203, 205–207, 216, E12.001, E12.058
See application file for complete search history.

(56) References Cited

U.S. PATENT DOCUMENTS

| 6,789,156 B1 * | 9/2004 | Waldspurger ..................... 711/6 |
| 6,944,740 B2 | 9/2005 | Abali et al. |
| 2007/0050423 A1 | 3/2007 | Whalen et al. |

OTHER PUBLICATIONS

Kulkarni et al., "Redundancy Elimination Within Large Collections of Files", Proceedings of the USENIX 2004 Annual Technical Conference, Jun. 2004.
Waldspurger, "Memory Resource Management in VMware ESX Server", Proceedings of the 5th Symposium on Operating Systems Design and Implementation, Boston, Massachusetts, USA, Dec. 9-11, 2002.
Smith, T.B. et al., "Memory Expansion Technology (MXT): Competitive Impact" IBM Journal of Research & Development (Mar. 2001) pp. 303-309, vol. 45, No. 2.
Tremaine, R.B. et al., "IBM Memory Expansion Technology (MXT)" IBM Journal of Research & Development (Mar. 2001) pp. 271-285, vol. 45, No. 2.

* cited by examiner

*Primary Examiner* — Jasmine Song
(74) *Attorney, Agent, or Firm* — Scully, Scott, Murphy & Presser, P.C.; Brian Verminski, Esq.

(57) ABSTRACT

A system and method for effectively increasing the amount of data that can be stored in the main memory of a computer, particularly, by a hardware enhancement of a memory controller apparatus that detects duplicate memory contents and eliminates duplicate memory contents wherein the duplication and elimination are performed by hardware without imposing any penalty on the overall performance of the system.

14 Claims, 3 Drawing Sheets

US 8,074,047 B2

SYSTEM AND METHOD FOR CONTENT REPLICATION DETECTION AND ELIMINATION IN MAIN MEMORY

BACKGROUND OF THE INVENTION

1. Field of the Invention

The present invention relates generally to data compression, such as implemented in memory systems of computing devices, and more particularly, to an improved memory controller and associated memory management system for effectively increasing the amount of data that can be stored in the main memory of a computer.

2. Description of the Prior Art

Traditionally, as shown in FIG. 1, a computer system 10 including a processor device (CPU) executes an Operating System (O/S) 12 natively on the computer hardware that is adapted for executing basic computer system functions in addition to controlling execution of one or more programs or processes. The computing system further includes two types of memory: a 'real' memory 15 that comprises the available memory that a processor, O/S and memory management hardware actually sees and addresses, and, an actual physical memory 20 (e.g., IC chips plugged into the computer) that is of a fixed size. It is understood that real memory is backed (mapped) onto part of the physical memory, and although not shown, and may be part backed by non-volatile storage media, (e.g., one or more hard disk drives) allowing virtual memory size to exceed real (physical) memory size. A process executing in the computer system 10 will thus have an associated real address space 15 that is the logical view of how a process is stored in memory.

As further shown in FIG. 1, the O/S and memory management hardware includes a memory controller 30 providing an indirection mechanism comprising a translation table or like device implementing address mapping function. For example, a translation table 25 is used to map one or more real memory blocks "Block A" and "Block B" as shown in FIG. 1, to respective physical memory blocks 21A and 21B in a one-to-one correspondence. As shown in the embodiment depicted in FIG. 1, thus two physical memory blocks are mapped to two more real memory blocks.

Thus, in view of FIG. 1, for purposes of discussion herein, it is apparent that the unit of access to memory is a block. The addresses provided to the memory controller including translation table 25, are called real addresses. A real address (or a real block number) is used to access a real memory block. The memory controller uses the indirection mechanism to store data in physical memory and, it is noted that a real memory block may get mapped to one or more physical memory blocks. Physical memory blocks are accessed by using physical memory addresses (or physical block numbers). As implied, a physical memory block can be the same size or smaller than a real memory block.

The use of physical memory thus requires implementation of the memory management hardware implementing a memory mapping unit or like translation table 25 that maps program addresses or pages to corresponding physical memory addresses or pages in physical memory. It is a function of the O/S 12 to ensure that the data and process a program is currently using is resident in real physical memory.

In prior art literature, particularly, in U.S. Patent Pub. No. 2007/0038837, there is disclosed a system for identifying at least two virtual pages that store identical data; causing each of the at least two virtual pages to correspond to one shared physical page, where said shared physical page stores identical data; and that services a memory request comprising an access of one of said virtual pages by accessing the shared physical page. This system enables multiple virtual addresses to map to the same physical location in memory if it has been determined that they are all intended to access the same data. Virtual addresses are identified and correspondence information (such as from a translation table) is changed in order to ensure that they all correspond to the same physical location, thus freeing up memory. The identification process may examine most commonly used pages, may use hash functions to create signatures for pages and compare those signatures. A count is maintained as to how many virtual addresses currently correspond to the location address, and where, if that number is greater than one, the location is set to be read-only.

Further, U.S. Patent Pub. No. 2007/0050423 discloses an intelligent duplicate management system for identifying duplicate electronic files that implements a hash-sieve process that expresses many existing approaches to duplicate detection. The first hash function could be, for example, the size of the block, and the resulting buckets are, hence, the groups of same-size blocks. The next hash function could be the identity, in which case a byte-to-byte comparison is performed, and the resulting buckets are then the groups of identical blocks, hence, indicating the groups of duplicate files.

A further prior art solution, found in the reference to Kulkarni, et al., entitled "Redundancy Elimination Within Large Collections of Files", Proceedings of the USENIX 2004 Annual Technical Conference, June 2004, discloses Redundancy Elimination at the Block Level (REBL) which leverages the benefits of compression, duplicate block suppression, and delta-encoding to eliminate a broad spectrum of redundant data in a scalable and efficient manner. REBL uses super-fingerprints, a technique that reduces the data needed to identify similar blocks while dramatically reducing the computational requirements of matching the blocks: it turns $O(n^2)$ comparisons into hash table lookups.

A further solution, found in the reference to Carl A. Waldspurger entitled "Memory Resource Management in VMware ESX Server", in Proceedings of the 5th Symposium on Operating Systems Design and Implementation Boston, Mass., USA Dec. 9-11, 2002 describes a complete software solution for identifying page copies by their contents. That is, in the "Vmware" product described, pages with identical contents can be shared regardless of when, where, or how those contents were generated by malting use of a hash value to summarize a page's contents and that is used as a lookup key into a hash table containing entries for other pages that have already been marked copy-on write (COW). VMware studies show a sharing (duplication) percentage of up to 67% among Virtual Machines.

It would be highly desirable to provide a system and method for detecting duplications of main memory content and eliminating them in order to be able to store a larger amount data in main (physical) memory. Moreover, it would be highly desirable to provide a system and method that performs the duplication detection and elimination solely in hardware and without imposing any penalty on the overall performance of the computing system.

SUMMARY OF THE INVENTION

It is an object of the present invention to provide a system and method for effectively increasing the amount of data that can be stored in the main memory of a computer, and particularly, to perform the duplication detection and elimination in hardware without imposing any penalty on the overall performance of the system.

According to a first aspect of the invention, there is provided a memory controller apparatus and method for controlling computer memory input [and output] operations in a computing system, particularly eliminating duplicate memory contents. The apparatus comprises:

a translation table for implementing translation of processor issued real memory block addresses to one or more physical memory block address corresponding to physical memory locations that receive input memory content for storage or output stored memory content;

means for calculating the hash value of a memory block content when a block of memory is being input for storage at a physical memory location, the translation table mapping all references for real memory blocks whose hashing values are identical to a single shared reference corresponding to a shared block of physical memory;

wherein, only one copy of content is stored at the shared block in physical memory for identical content thereby eliminating duplicate memory blocks in a computer memory system.

Further to this aspect, the physical memory comprises a cache for storing frequently used blocks addressable by the processor issued real addresses, the shared block of physical memory comprising a cache line, wherein the cache line size is typically 1 Kbyte or less, but without losing generality it could be larger than 1 Kbyte depending upon a desired implementation.

Furthermore, the memory controller apparatus further comprises:

a hash table, provided in the cache, for storing hash values of each real memory contents stored in the physical memory;

a means for comparing a calculated hash value against the cache hash table when a block of the memory is accessed, the comparing means comparing the calculated hash value against the cache hash table values to determine if a block of identical content already exists in the physical memory, and, when a matching hash value is found, the translation table provides the single reference of the identical content to the shared physical memory location for accessing the identical content, the comparing of hash values being performed seamless to a user or computer system operations.

Moreover, further to this aspect of the invention, the memory controller apparatus further comprises:

a means for maintaining a reference count for each physical block indicating the number of references in the translation table, the reference count of a physical memory block being incremented by one whenever a new reference to the block is added and, the reference count of a physical memory block being decremented by one when a reference to a physical block is removed. Effectively, the reference count indicates the number of real blocks sharing a physical block.

It is understood that, in accordance with the invention, the creation and comparison of hash values are performed as blocks are being accessed with hash value calculating and comparing operations performed seamless to the user or computer operations.

According to a further aspect of the invention, there is provided a method for controlling computer memory input and output operations in a computing system, the method comprising:

implementing, via a translation table, translation of processor issued real memory block addresses to one or more physical memory block addresses corresponding to physical memory locations to receive input memory content for storage or output stored memory content; and, calculating a hash value of a memory block content when a block of memory is being input for storage at a physical memory location, the translation table mapping all references for real memory blocks whose hashing values have been previously identified as identical, to a single shared reference corresponding to a shared block of physical memory;

wherein, only one copy of content is stored at the shared block for identical content thereby eliminating duplicate memory blocks in a computer memory system.

Advantageously, the system and method for effectively increasing the amount of data that can be stored in the main memory of a computer works particularly well, e.g., on computing devices such as servers with multiple guest virtual machines. In such an environment, 1) memory is shared among multiple virtual machines (which makes the memory a scarce resource); and, 2) there are significant number of identical memory blocks being used by multiple virtual machines.

BRIEF DESCRIPTION OF THE DRAWINGS

Further features, aspects and advantages of the structures and methods of the present invention will become better understood with regard to the following description, appended claims, and accompanying drawings where:

DETAILED DESCRIPTION OF THE PREFERRED EMBODIMENT

The present invention is directed to a system and method for effectively increasing the amount of data that can be stored in the main memory of a computer. This approach works particularly well, on servers with multiple guest virtual machines. In such environment, 1) memory is shared among multiple virtual machines (which makes the memory a scarce resource) and 2) there are significant number of identical memory blocks being used by multiple virtual machines. In the invention, the memory content duplication detection and elimination in hardware are performed without imposing any penalty on the overall performance of the system. Moreover, all duplicate memory contents will eliminate duplicates regardless of the software or the operating system being used on the computer.

According to the present invention, in order to detect duplication, when a block is written to the memory, a hashing mechanism configured as a hardware device executing a hashing function is concurrently implemented to create a hash value of the content of the block. In one embodiment, a hashing function such as "SHA1" may be used which is a cryptographically secure hash designed by NIST and the NSA for the Secure Hash Standard and yields a 160 bit result, for example. It is understood that even more secure hash functions may be used according to the invention.

Once the hash value of a block is obtained, it is compared with the hash values of other memory blocks previously stored. That is, a hash value of a real block is compared with that of all or some of existing blocks in memory and identical blocks are identified.

Figure 1:
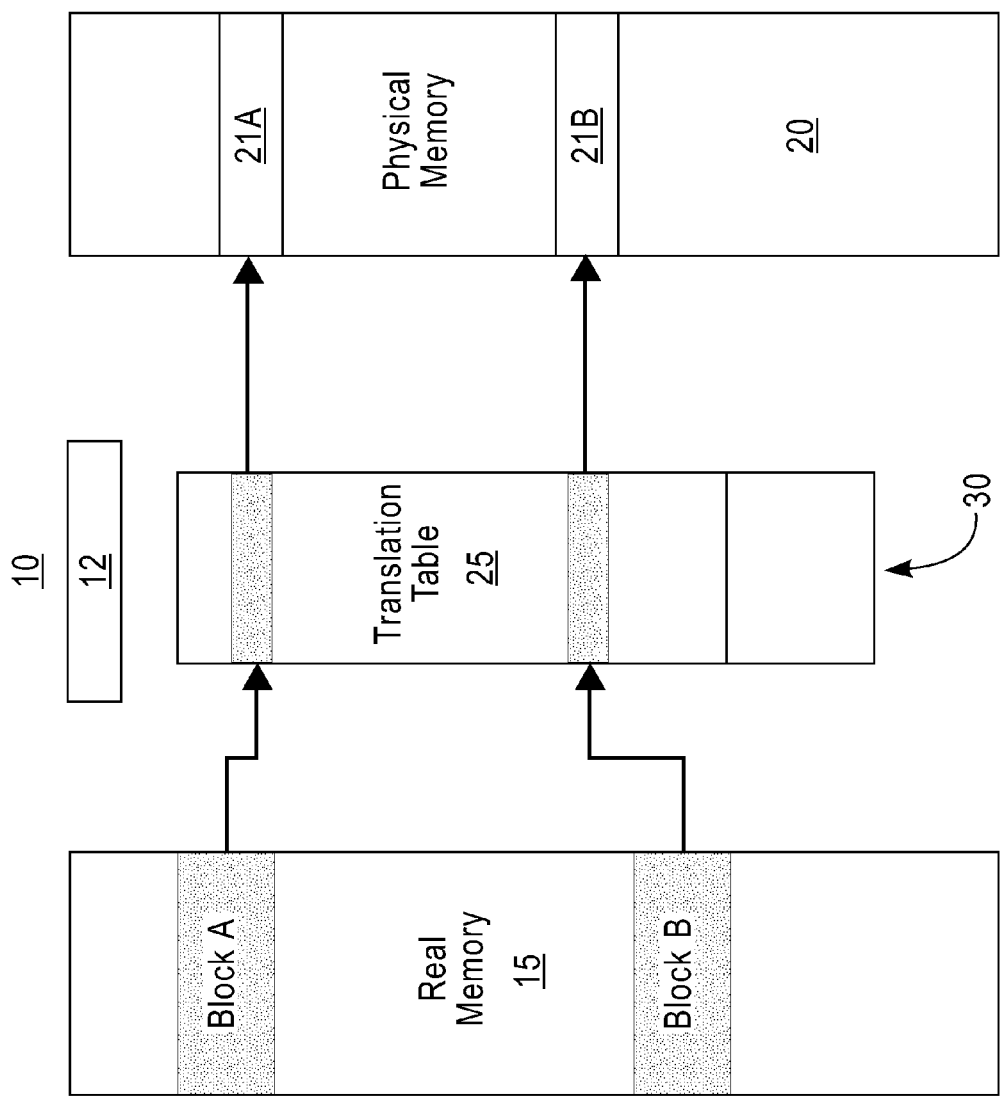
FIG. 1 depicts generally a memory sub-system of a computer device including an indirection mechanism in the form of a translation table that is part of a conventional memory controller according to the prior art; and, FIG. 2 depicts generally an indirection mechanism in the form of a translation table that is modified in accordance with the present invention; and, FIG. 3 is a detailed diagram depicting the memory controller hardware mechanisms for modifying the indirection mechanism according to the present invention to enable detection of duplicate main memory content and eliminate them to effectively increase the amount of physical memory and real memory available to processors.
Figure 2:
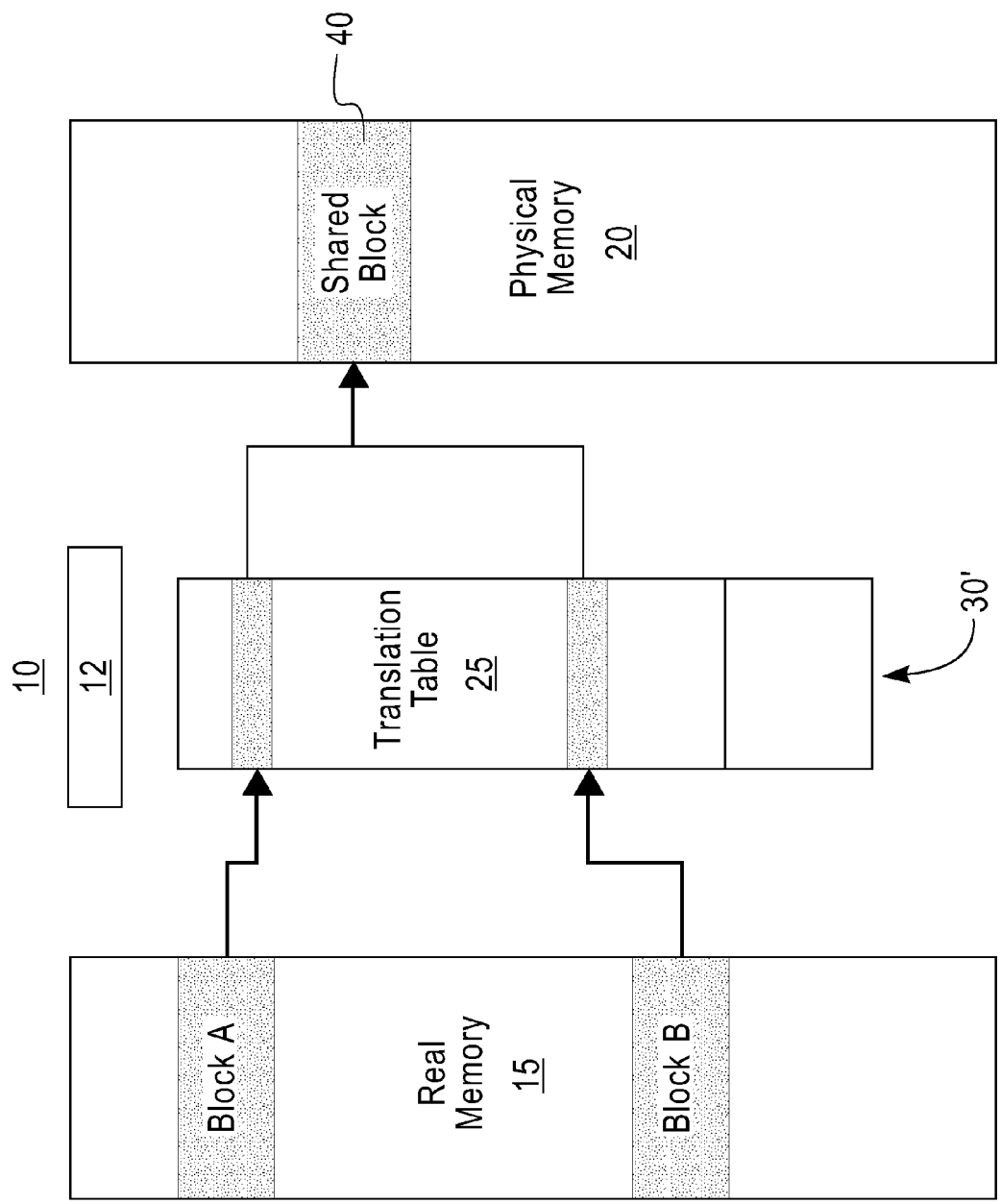
Figure 3:
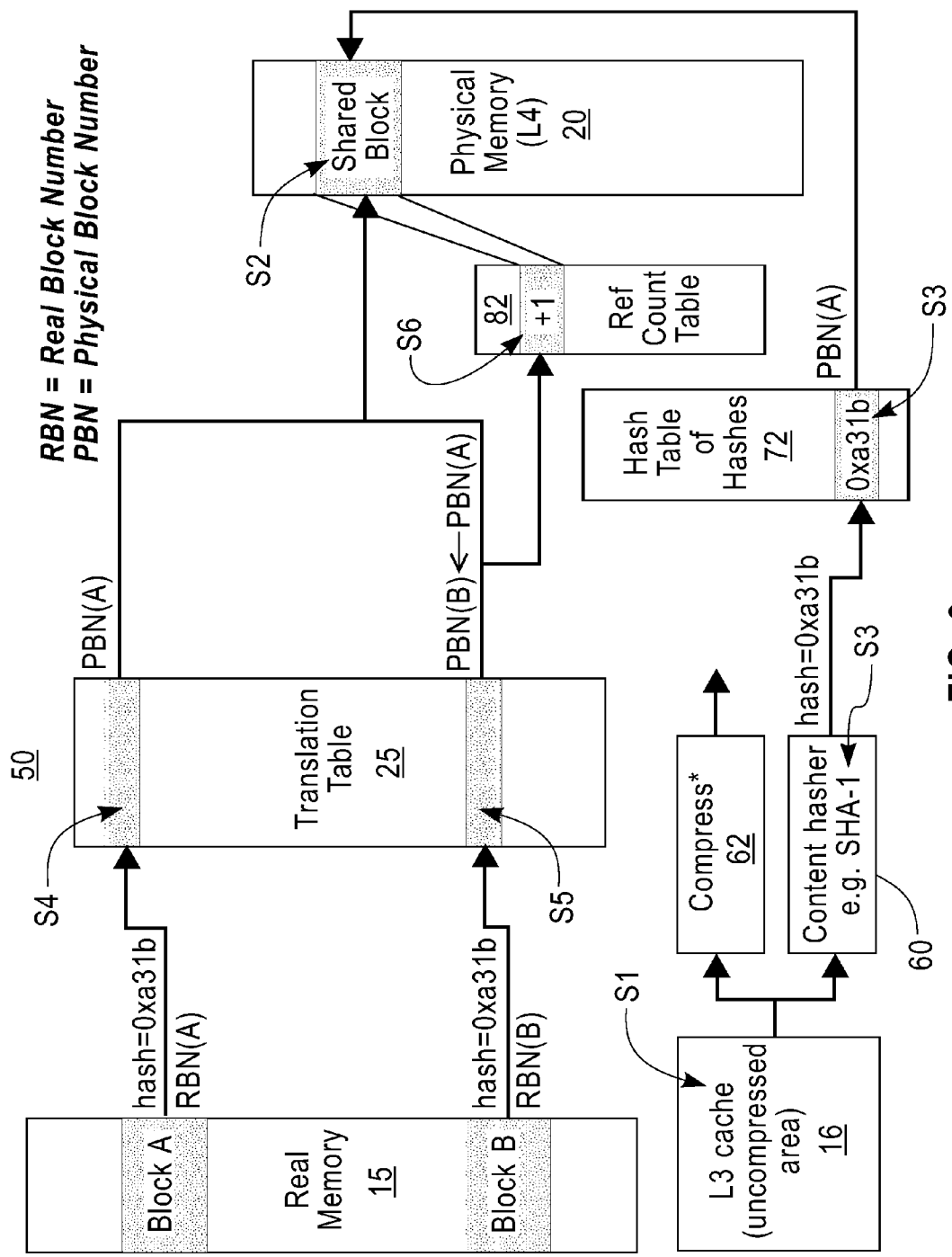

FIG. 2 depicts generally a memory controller device 30' including indirection mechanism in the form of a translation table 25' that is modified in accordance with the present invention. According to the invention, if a real memory block being accessed by a processor, e.g., stored or retrieved, with the same hash value already exists, the indirection mechanism (e.g., translation table 25) implements a modified mapping function such that accesses to those blocks with same hash value are directed to one copy of the block in a shared physical memory location 40, as depicted in FIG. 2. That is, as shown in FIG. 3, the indirection table 25 is modified such that references to real blocks whose contents are identical, e.g., real memory Blocks A and Block B (S4 and S5), are substituted by reference to a single set of physical blocks 40 stored in physical memory (S2). It is noted that the indirection is performed at real memory block level granularity. Thus, in one embodiment, the real blocks obtained from the memory controller indirection may constitute the entirety of processor or application requested data.

In one embodiment, the physical memory is a cache of a cache memory hierarchy, e.g., a L3 level cache, though the invention is not so limited. Preferably, the duplicate single set of shared physical blocks 40 in memory comprises a cache line.

Further, as the indirection entry used for one block is used for other duplicate blocks and, a reference count is kept for each physical memory block. That is, a reference count is kept for each physical block indicating the number of references in the indirection table. The reference count of a physical block is incremented whenever a new reference to the block is added, i.e., whenever a duplicate real memory content is detected, the reference count of corresponding physical memory block(s) is increased. Likewise, whenever a physical memory block is released, the reference count gets decremented by one. A list of free physical memory blocks is kept by the memory controller 12. When a physical memory reference count is reduced to zero, the block is added to the list of free blocks 12 as shown in FIG. 2.

In the hardware process, the creation and comparison of hash values are performed as blocks are being accessed. Moreover, the creation and comparison of hash values are performed in the background, seamless to the user or computer system operations.

More particularly, as shown in a more FIG. 3, there is provided a detailed diagram of a novel memory controller system and apparatus 50 and the various mechanisms (identified as steps S1-S6), implemented in hardware, for modifying the indirection mechanism according to the present invention. The memory controller 50 is responsible for detecting and eliminating physical memory disk blocks and particularly enables detection of duplicate main memory content and eliminates them. As a result, the memory controller can present a memory larger than the physical memory 20 to the higher level of memory hierarchy, i.e., the Real Memory 15. In operation, when a block "A" in real memory is accessed, for example, from a memory storage device such as a local cache 16 (S1), the memory controller functions to calculate the hash value of its content (S3). Thus, as shown in FIG. 3, a content hashing function (algorithm) is implemented in hardware by a content hashing block 60 for calculating a hash of the memory contents to be accessed. Hash functions such as SHA-1 and SHA-2 can be utilized in hashing block 60, but it is understood that other types of hashing algorithms may be used. In the example embodiment depicted in FIG. 3 for illustrative purposes, a block of real memory is calculated to have a SHA-1 hashing value of 0xa31b. During this calculation other operations such as compression or encryption, or both, and decompression or decryption or both, can be performed in hardware concurrently for memory block storage operations (S3).

Once the hash value is calculated in hardware block 60, the controller accesses a Hash Table of Hash Values, i.e., Table of Hashes 72, and refers to the hash table contents in order to determine whether there already exists a block in physical memory with the same hashing value (S3) therefore with identical data. In one embodiment, the hash table is stored in and is part of a cache for storing frequently used blocks addressable by processor issued real addresses. In one embodiment, this hash table 72 is a direct mapped or fully associative cache of a size such that hashes being searched are found with high probability therefore catching most of the duplicates in the memory. In one embodiment, each row of the hash table, is addressed by a subset of the hash value's bits, and remaining bits of the hash value is stored in that particular row. Once candidate hash values are found, they are compared with the hash value of interest in order to see if an exact match exists.

Thus, in the example depicted, the hashing table 72 is traversed or one or more of its entries are looked up to determine whether the hash value of hashing value of 0xa31b exists (S3). If there exists such a block, a corresponding reference count in the Reference Count Table 82 for the physical page is incremented (S6). That is, as shown in FIG. 3, the system initiates an increment of a +1 value to an entry in the Reference Count Table 82 that corresponds to this hashing value, i.e., corresponding to the hashed memory block A. Further, the system initiates an update to the Translation Table 25 such that that the entry for the real page being accessed is updated to refer to the physical page with the same hash value (S2). Thus, as shown in FIG. 2, both memory blocks A and B having the same hash values therefore having the identical content, will point to the shared (common) memory block 40 in the physical memory page (S4 and S5).

In such a configuration depicted in FIG. 3, real pages with the same hash value will end up referring to the same physical memory block and therefore duplications are eliminated and only one copy of data is stored in the physical memory. In another embodiment, real pages are bigger than physical pages.

In a further embodiment, each real page can be as big as an integer number of physical pages, e.g., the size of each real page is equal to that of n physical pages. In such an embodiment, n hash values for the real page are calculated concurrently. Furthermore, the Hash Table of Hashes is searched for all n values and the Translation Table entries for real pages contain pointers to n physical pages. When the hash value of a real page (or one of the n values in example provided earlier) is not found in the Hash Table of Hashes, then a new unused physical memory block is obtained. The list 12 of free physical pages (FIG. 2) are kept such that whenever a free page is needed, such a page can be quickly found. Then, the physical page is removed from the free list and is used to store the content of the real page. The Translation Table is updated that the real page entry refers to this physical page.

While the invention has been particularly shown and described with respect to illustrative and preferred embodiments thereof, it will be understood by those skilled in the art

Having thus described our invention, what we claim as new, and desire to secure by Letters Patent is:

1. A memory controller apparatus for controlling computer memory input and output operations in a computing system having a physical memory and a cache memory, said apparatus comprising:

a means for calculating a hash value of a memory block content when a block of memory is being accessed for content storage at a location in said physical memory;

a hash table provided in said cache memory, for storing calculated hash values corresponding to said real memory block contents stored in said physical memory;

a translation table for mapping all references for real memory blocks whose hashing values have been identified as identical, to a single shared reference corresponding to a shared block of physical memory in which only one copy of content is stored for identical content;

a means operatively associated with said translation table for comparing a calculated hash value against said calculated hash table values corresponding to stored memory blocks when a block of said memory is accessed for content storage, wherein, in response to determining a matching hash value, said translation table providing said single reference of said identical content corresponding to said shared physical memory location for accessing said identical content;

a means for maintaining a reference count for each physical block indicating the number of references in the translation table, said reference count of a physical memory block being incremented by one whenever a new reference to the block is added and, the reference count of a physical memory block being decremented by one when a reference to a physical block is removed; and, a means for maintaining a list of free memory blocks in said physical memory, wherein when a reference count of a physical memory block is zero, said controller adding said physical memory block to said list of free physical memory blocks.

2. The memory controller apparatus as claimed in claim 1, wherein said shared block of physical memory comprises a cache line.

3. The memory controller apparatus as claimed in claim 1, wherein
said comparing of hash values is performed seamless to a user or computer system operations.

4. The memory controller apparatus as claimed in claim 1, further comprising:
means implementing one or both of compression and encryption of memory block contents when storing said block in said shared physical memory location.

5. The memory controller apparatus as claimed in claim 1, further comprising:
means implementing one or both of decompression and decryption of memory block contents when accessing said block from said shared physical memory location.

6. The memory controller apparatus as claimed in claim 1, wherein said means for calculating a hash value implements a SHA-1 or SHA-2 hashing algorithms.

7. A method for controlling computer memory input and output operations in a computing system having a physical memory and a cache memory, said method comprising:

calculating a hash value of a memory block content when a block of memory is being input for storage at a physical memory location;

storing, in a hash table provided in said cache, hash values corresponding to said real memory contents stored in said physical memory;

mapping, via said translation table, all references for real memory blocks whose hashing values have been previously identified as identical, to a single shared reference corresponding to a shared block of physical memory;

said mapping including:

comparing, when a block of said memory is accessed, its calculated hash value against said cache hash table values to determine if a block of identical content already exists in said physical memory, and, modifying, in response to determining a matching hash value, said translation table to provide said single reference of said identical content to said shared physical memory location for accessing said identical content, wherein only one copy of content is stored at said shared block in physical memory for said identical content;

maintaining a reference count for each physical block indicating the number of references in the translation table, and one of:

incrementing said reference count by one of a physical memory block whenever a new reference to the block is added or, decrementing the reference count of a physical memory block by one when a reference to a physical block is removed; and maintaining a list of free memory blocks in said physical memory, wherein when a reference count of a physical memory block is zero, said controller adding said physical memory block to said list of free physical memory blocks.

8. The method as claimed in claim 7, wherein said shared block of physical memory comprises a cache line.

9. The method as claimed in claim 8,
wherein said comparing of hash values being is performed seamless to a user or computer system operations.

10. The method as claimed in claim 7, further comprising:
implementing one or both of compression and encryption of memory block contents when storing said block in said shared physical memory location.

11. The method as claimed in claim 7, further comprising:
implementing one or both of decompression and decryption of memory block contents when accessing said block from said shared physical memory location.

12. A computer memory system for a computing device including a memory controller and one or more types of memory, wherein the content of main memory is cached in a caching unit, said system comprising:

a means for writing to a real memory block, a hash calculator for calculating a hash value of each real memory block content to be stored in said physical memory for a memory write operation;

a memory storage cache indexible by said memory controller for storing a first table including stored hash values of some or all of the real memory blocks stored in said physical memory;

a means for comparing said calculated hash value against said stored hash values when performing said writing to determine if a block of identical content already exists in said physical memory;

a means for directing the memory controller to substitute references to real memory blocks whose contents are identical by a single reference to a single set of physical blocks stored in physical memory, said directing means performing at real memory block level granularity wherein a single physical memory block is mapped to one or more real blocks in real memory,
wherein said table of hash values stored in said memory storage cache is indexed by a set of bits found in the hash value, wherein each row in the hash table is addressed by a subset of the hash value's bits, and remaining bits of the hash value is stored in that particular row.

13. The computer memory system as claimed in claim 12, wherein the memory storage cache is a direct mapped or fully associative cache and size of the cache is such that hashes being searched are found with high probability.

14. The computer memory system as claimed in claim 12, further comprising:

a means for maintaining a reference count for each physical block indicating the number of references in a translation table, said reference count of a physical memory block being incremented by one whenever a new reference to the block is added and, the reference count of a physical memory block being decremented by one when a reference to a physical block is removed; and, a means for maintaining a list of free memory blocks in said physical memory, wherein when a reference count of a physical memory block is zero, said controller adding said physical memory block to said list of free physical memory blocks.

* * * * *